July 11, 1961   H. KRAUSE ET AL   2,992,031
DOUBLE ROCKER TYPE HOOD LOCK
Filed July 2, 1958   2 Sheets-Sheet 1
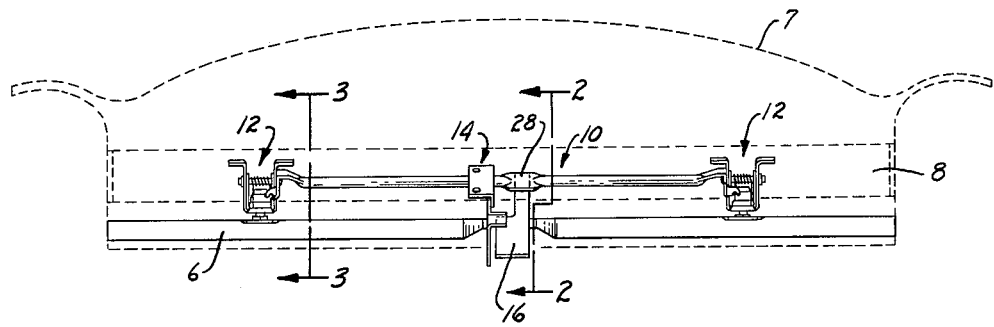
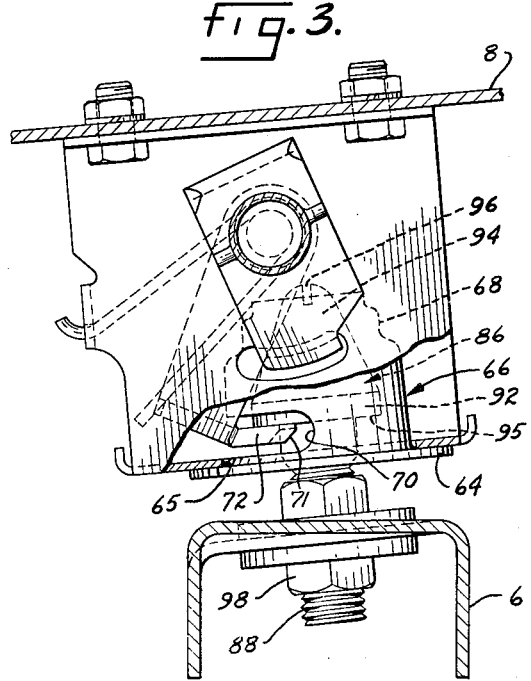
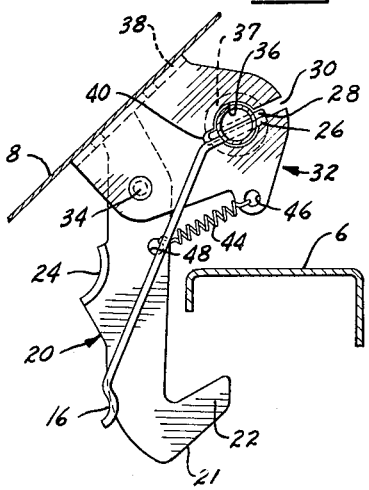
INVENTORS.
HERBERT KRAUSE
GEORGE KORAB
BY
Parker and Carter
ATTORNEYS.

July 11, 1961 H. KRAUSE ET AL 2,992,031
DOUBLE ROCKER TYPE HOOD LOCK
Filed July 2, 1958 2 Sheets-Sheet 2
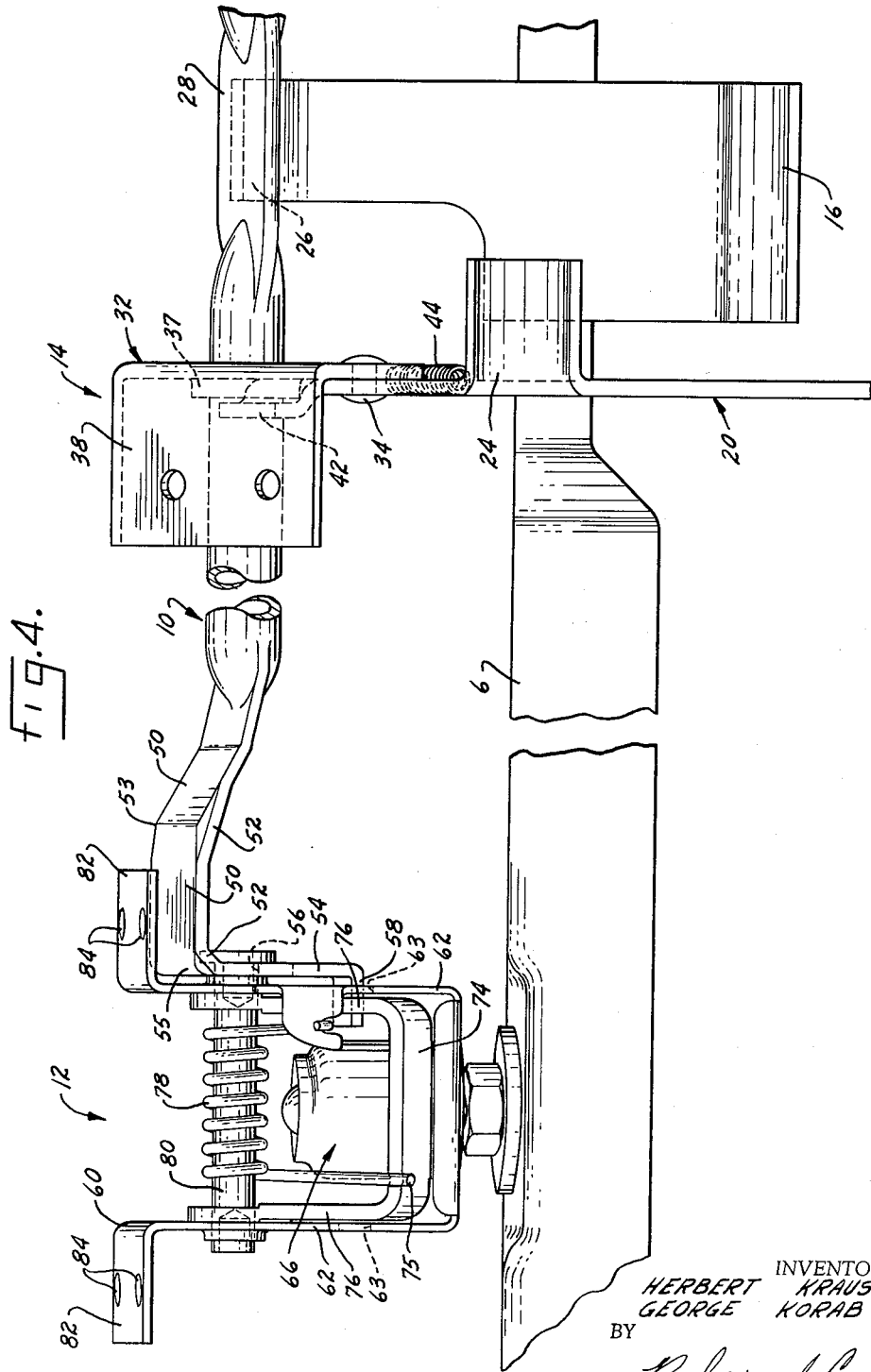
INVENTORS.
HERBERT KRAUSE
GEORGE KORAB
BY
*Parker and Carter*
ATTORNEYS.

2,992,031
DOUBLE ROCKER TYPE HOOD LOCK

Herbert Krause and George Korab, Chicago, Ill., assignors to Chicago Forging and Manufacturing Company, Chicago, Ill., a corporation of Delaware
Filed July 2, 1958, Ser. No. 746,129
5 Claims. (Cl. 292—29)

This invention relates to improvements in hood latches and has for one purpose to provide improved hood latches useable in securing alligator type auto hood closures.

Another purpose is to provide a hood latch structure in which a single member may be employed to control and actuate both a plurality of primary latches and a secondary or safety latch.

Another purpose is to provide a hood structure whereby a plurality of primary latches are operated by an elongated member, and a safety latch and the elongated member are operated by a single manual lever.

A further purpose is to provide hood latching mechanisms simple in structure and operated by the movement of an elongated bar running across the hood.

Another purpose is to provide a symmetrical hood latching mechanism which may be interchangeable with other hood latching mechanisms in the hood latching structure.

Another purpose is to provide a hood latching structure that is reversible in that the latching mechanisms may be attached either to the hood or to the hood closure of the automobile.

A further purpose is to provide a hood latch structure that can be rapidly assembled on an automobile assembly line.

Other objects and advantages of our invention will be readily comprehended from the following detailed descriptions and accompanying drawings wherein:

FIGURE 1 is a view of the front of an automobile with the present invention thereon;

FIGURE 2 is a side view of the safety hook taken along the line 2—2 of FIGURE 1;

FIGURE 3 is a side view of the primary latching mechanism taken along the line 3—3 of FIGURE 1; and FIGURE 4 is a closeup of a section of the hood latching structure as seen from the front of an automobile.

Referring to FIGURE 1 wherein 10 indicates an elongated member or bar running substantially transversely to the body of the car at the opposite ends of which are attached the primary latching mechanisms 12. Between these primary latching mechanisms 12 is attached the safety latch mechanism indicated at 14. 16 indicates the manual lever by which the hood latch mechanism is actuated.

Referring more particularly now to FIGURES 2 and 4, 20 indicates the safety hook with extension 22, and a slanted surface 21, which extension is designed to catch on the hood cross bracket 6 in case the primary latches do not hold. 24 indicates a generally perpendicular projection from safety hook 20 on which the manual lever 16 makes contact. 26 indicates the upper portion of actuating handle 16 which makes contact with the flat portion 26 of the elongated member 10. 32 indicates generally the safety hook latch plate or support with an opening 36 into which the elongated member 10 may fit. 30 and 40 indicate slots for the flat part 28 of the elongated member 10. 38 indicates a perpendicular portion of the safety hook latch plate 32 which is fastened to the hood mounting bracket 8. 37 indicates a bearing sleeve which surrounds the aperture 36 on plate 32 and provides a smooth surface for rotation of member 10. A stop 42 abuts safety hood latch plate 32 and prevents unwanted counterclockwise motion of safety hook 20. 34 indicates the pivot point where safety hook 20 is pivotally connected to safety hook 20 at 48 and is connected to safety hook latch plate 32 at 46.

At the opposite ends elongated member 10 is more or less flattened as shown at 50. The angles 53 and 55 being completed by fillets 52. The end plate of elongated member 10 designated at 54 has an opening 56 and a projection shown at 58.

The opening 56 is concentric with the axis of rotation of bar 10.

Referring now to FIGURES 3 and 4, a keeper-receiving structure is shown wherein 60 indicates the primary latch casing or latch plate which has in its sides 62 a more or less curved or arcuate slot or aperture 63 into which projection 58 fits. 65 indicates an opening at the bottom of casing 60 into which a cylindrical keeper way indicated generally at 66 extends. The bottom portion 64 of the keeper way 66 is perpendicular to the general structure of 66 and is attached to latch 60 around aperture 65. 68 indicates the generally stepped cylindrical sides of keeper way 66. 70 indicates a slot in the bottom portion of keeper way 66 into which the primary latch extension 72 with chamfered edge 71 extends. 74 indicates generally the primary latch which is made up of the primary latch extension 72 and oppose sides 76. The sides 76 pivoting on rod 80 which rod passes through the opposite sides of the casing 60 and through the opening 56 and is concentric with the axis of rotation of bar 10. On rod 80 is a wound spring 78, an extension of which, 75, engages primary latch 74 and forces the primary latch extension 72 into the slot 70. The plates shown at 82 are more or less perpendicular to the sides of the casing 60, and are an extension thereof. Holes 84 are in plates 82 for mounting the casing 60 to the mounting bracket 8.

The keeper member indicated generally at 86 may comprise an elongated shaft 88, a generally cylindrical portion 92 and terminates in a generally conical portion 94. The bottom of the cylindrical portion 92 is indicated at 95, and it is into this area that the latch extension 72 extends. A tool engaging slot 96 may be provided in the outer tip or upper end of the keeper 86 for ease in installing, adjusting and removing the keeper from the hood portion. It is understood that the shaft 88 may have its inner or lower end portion threaded for engagement with the securing means shown at 98. It is thought to be clear that the keeper and latching structure could be reversed in position or location so far as the hood and hood enclosure are concerned without departing from the nature and scope of our invention.

It will be realized that whereas we have described and claimed a particular and operative device, nevertheless many changes may be made in size, shape, number and dispositions of parts without departing from the spirit of our invention. We, therefore, wish our description to be taken as in the broad sense illustrative or diagrammatic rather than as limiting us to our specific showing herein.

The use and operation of our invention are as follows:

As the hood closure 7 is moved downward towards the hood, the keeper enlargement 94 enters keeper way 66. Should the hood closure 7 be somewhat out of alignment the tapered portion 94 would impinge upon one of the stepped cylindrical surfaces 68 of the keeper way 66, thus forcing the closure 7 into proper position and aligning the keeper 86 generally with the keeper way 66. The tapered keeper surface comes in contact with the chamfered edge 71 of the primary latch extension 72 forcing the primary latch out of the slot 70 and toward the non-latching position against the action of the spring 78. As soon as the keeper enlargement passes beyond the slot 70 the spring 78 is effective to force the keeper latch extension 72 back into latching position contacting bottom surface 95 of the keeper. Simultaneous with this action, slanted edge 21 of safety hook 20 contacts the hood cross bracket 6. The slanted surface of the safety hook in combination with the downward motion of the hood closure forces the safety hook in a clockwise direction against the action of spring 44 allowing the hook to go around hood cross bracket 6. The hood closure is now fastened by means of the two primary hood latches indicated generally at 12 and by the safety hook latch indicated generally at 14.

When the operator desires to raise the hood closure he need only grasp the manual lever 16 and move it clockwise. As he does so, the safety hook is moved in a clockwise direction, elongater bar 10 is rotated in a against the safety hook projection 24 thus disengaging the safety hook. As manual lever 16 is moved in a clockwise direction, elongated bar 10 is rotated in a clockwise manner causing projection 58 which is inserted in slot 63 to force the keeper latch 74 in a clockwise direction against the action of spring 78. This allows the keeper to be disengaged from the primary latching mechanism, and so permits the hood closure of the automobile to be released from the hood.

Another feature of our invention is its ease of assembly line installation. First, the support member for safety hook is attached, then the flat portion 28 of the elongated bar 10 is inserted in slots 30 and 40 of the safety hook latch plate 32. The bar is then moved sideways into its operating position. The primary latching mechanisms 12 are then attached to complete assembly.

We claim:

1. In a latching structure, a pair of spaced latching plates, a latch rotatably mounted on each of said plates, an elongated bar extending between said plates and having its opposite ends rotatably mounted on said plates, said bar having angularly offset end portions each operably engaging one of said latches, the axis of rotation of said bar being concentric with that of said end portions and said latches and a support positioned between said plates, an aperture in said support, an outwardly open slot bisecting said aperture, said bar having an intermediate flattened portion formed and adapted to enter said slot, said aperture defining a bearing surface for said bar.

2. The structure of claim 1 characterized by and including a safety hook rotatably mounted on said support adjacent said bar and intermediate the ends thereof and an actuating member, fixed on and for rotation with said bar, said safety hook having a projection overlying the path of rotation of said actuating member whereby rotation of said actuating member is effective to rotate said bar and said safety hook.

3. The structure of claim 2 wherein said actuating member is fixed on an intermediate portion of said bar, said intermediate portion being of less thickness than the remainder of said bar, said intermediate portion penetrating said slot a distance sufficient to axially align said aperture and bar, said bar being slidable in said aperture to move said intermediate portion out of engagement with said support.

4. In a latching structure, a pair of spaced latching plates, a latch rotatably mounted on each of said plates, an elongated bar extending between said plates and having its opposite ends rotatably mounted on said plates, said bar having end portions thereof operably engaging said latches, the axis of rotation of said bar being concentric with that of said latches, and a support positioned intermediate said plates, said support having an aperture and an outwardly open slot bisecting said aperture, said bar being rotatably mounted on said support and having an intermediate flattened portion formed and adapted to enter said slot, and an actuating member fixed to said bar.

5. In a latching structure, a pair of spaced latching plates, a latch rotatably mounted on each of said plates, an elongated bar extending between said plates and having its opposite ends rotatably mounted on said plates, said bar having end portions thereof operably engaging said latches, the axis of rotation of said bar being concentric with that of said latches, a support positioned between said plates and rotatably mounting said bar, a safety hook rotatably mounted on said support adjacent said bar, an actuating member fired on said bar, said safety hook having a projection overlying the path of rotation of said actuating member whereby rotation of said actuating member is effective to rotate said bar and said safety hook.

References Cited in the file of this patent

UNITED STATES PATENTS

| 334,685 | Bassell | Jan. 19, 1886 |
| 2,193,132 | Hynes | Mar. 12, 1940 |
| 2,237,060 | Reynolds | Apr. 1, 1941 |
| 2,312,578 | Northrup et al. | Mar. 2, 1943 |
| 2,561,496 | Cicero | July 24, 1951 |
| 2,807,491 | Deeley-Jones | Sept. 24, 1957 |
| 2,828,989 | Kaiser | Apr. 1, 1958 |